United States Patent [19]

Fischer

[11] Patent Number: 5,895,092
[45] Date of Patent: Apr. 20, 1999

[54] CHILD CAR SEAT WITH AIR BAG PROTECTION BAR

[76] Inventor: Dean A. Fischer, 4979 Old State Rd. North, Norwalk, Ohio 44857

[21] Appl. No.: 09/031,479

[22] Filed: Feb. 26, 1998

[51] Int. Cl.[6] .................................................. A47D 15/00
[52] U.S. Cl. ........................... 297/256.15; 297/488
[58] Field of Search .......................... 297/256.15, 250.1, 297/487, 488; 403/381

[56] References Cited

U.S. PATENT DOCUMENTS

| | | |
|---|---|---|
| 2,369,930 | 2/1945 | Wagner, Sr. . |
| 2,806,511 | 9/1957 | Merelis . |
| 4,986,600 | 1/1991 | Leblanc et al. . |
| 5,061,012 | 10/1991 | Parker et al. . |
| 5,427,432 | 6/1995 | Meeker et al. ............ 297/256.15 |
| 5,511,850 | 4/1996 | Coursey . |
| 5,556,162 | 9/1996 | Raffini . |
| 5,660,434 | 8/1997 | Nicksic . |

*Primary Examiner*—Milton Nelson, Jr.

[57] ABSTRACT

A new child car seat with air bag protection bar is provided for protecting a child in event of the release of an air bag. Included is a car seat portion having a seat portion and a back portion. The car seat portion includes a harness strap for securing a child therein. A lower end of the back portion has a slot therethrough for receiving a seat belt of a vehicle therethrough to facilitate securement of the car seat portion within the vehicle. A restraint system is provided including a pair of inner vertical brackets secured on opposing sides of the back portion of the car seat portion. The restraint system includes a pair of outer vertical brackets slidably received within the inner vertical brackets. The restraint system includes a pair of horizontal supports pivotally coupled with upper ends of the outer vertical brackets. An outer portion of the horizontal supports have a channel formed therein. An outer end of the horizontal supports have an aperture therethrough. The restraint system includes a cross bar extending between the outer portions of the horizontal supports.

6 Claims, 3 Drawing Sheets

CHILD CAR SEAT WITH AIR BAG PROTECTION BAR

BACKGROUND OF THE INVENTION

1. Field of the Invention

The present invention relates to child seats and more particularly pertains to a new child car seat with air bag protection bar for protecting a child in event of the release of an air bag.

2. Description of the Prior Art

The use of child seats is known in the prior art. More specifically, child seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art child seats include U.S. Pat. No. 5,108,152 to Reilly et al.; U.S. Pat. No. 3,992,028 to Abe et al.; U.S. Pat. No. 4,690,456 to Chiba et al.; U.S. Pat. No. 5,324,071 to Gotomyo et al.; U.S. Pat. No. 5,282,648 to Peterson; and U.S. Pat. No. Des. 334,847 to Takahashi et al.

While these devices fulfill their respective, particular objectives and requirements, the aforementioned patents do not disclose a new child car seat with air bag protection bar. The inventive device includes a car seat portion having a seat portion and a back portion. The car seat portion includes a harness strap for securing a child therein. A lower end of the back portion has a slot therethrough for receiving a seat belt of a vehicle therethrough to facilitate securement of the car seat portion within the vehicle. A restraint system is provided including a pair of inner vertical brackets secured on opposing sides of the back portion of the car seat portion. The restraint system includes a pair of outer vertical brackets slidably received within the inner vertical brackets. The restraint system includes a pair of horizontal supports pivotally coupled with upper ends of the outer vertical brackets. An outer portion of the horizontal supports have a channel formed therein. An outer end of the horizontal supports have an aperture therethrough. The restraint system includes a cross bar extending between the outer portions of the horizontal supports.

In these respects, the child car seat with air bag protection bar according to the present invention substantially departs from the conventional concepts and designs of the prior art, and in so doing provides an apparatus primarily developed for the purpose of protecting a child in event of the release of an air bag.

SUMMARY OF THE INVENTION

In view of the foregoing disadvantages inherent in the known types of child seats now present in the prior art, the present invention provides a new child car seat with air bag protection bar construction wherein the same can be utilized for protecting a child in event of the release of an air bag.

The general purpose of the present invention, which will be described subsequently in greater detail, is to provide a new child car seat with air bag protection bar apparatus and method which has many of the advantages of the child seats mentioned heretofore and many novel features that result in a new child car seat with air bag protection bar which is not anticipated, rendered obvious, suggested, or even implied by any of the prior art child seats, either alone or in any combination thereof.

To attain this, the present invention generally comprises a car seat portion having a seat portion and a back portion. The car seat portion includes a harness strap for securing a child therein. A lower end of the back portion has a slot therethrough for receiving a seat belt of a vehicle therethrough to facilitate securement of the car seat portion within the vehicle. A restraint system is provided including a pair of inner vertical brackets secured on opposing sides of the back portion of the car seat portion. The inner vertical brackets each have a female dovetail recess formed along a length thereof. The recess has a plurality of linearly aligned apertures therein. The restraint system includes a pair of outer vertical brackets. The outer vertical brackets each have a male dovetail member extending outwardly therefrom for being slidably received within the female dovetail recesses of the inner vertical brackets. The outer vertical brackets each have upper and lower locking pins for selectively engaging two of the plurality of apertures of the inner vertical brackets. The restraint system includes a pair of horizontal supports pivotally coupled with upper ends of the outer vertical brackets. An outer portion of the horizontal supports have a channel formed therein. An outer end of the horizontal supports have an aperture therethrough. The restraint system includes a cross bar extending between the outer portions of the horizontal supports. The cross bar includes an interior rigid member and an exterior padded member. The interior rigid member has T-shaped stems extending outwardly of opposite ends thereof for being slidably received within the channels formed within the horizontal supports. The opposite ends of the interior rigid member each have a spring pin extending outwardly thereof for selectively engaging the apertures of the outer ends of the horizontal supports. The restraint system includes a pair of angular brackets extending between the horizontal supports and the outer vertical brackets. Upper ends of the angular brackets pivotally couple with the T-shaped stems of the cross bar.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new child car seat with air bag protection bar apparatus and method which has many of the advantages of the child seats mentioned heretofore and many novel features that result in a new child car seat with air bag protection bar which is not anticipated, rendered obvious, suggested, or even implied by any of the prior art child seats, either alone or in any combination thereof.

It is another object of the present invention to provide a new child car seat with air bag protection bar which may be easily and efficiently manufactured and marketed.

It is a further object of the present invention to provide a new child car seat with air bag protection bar which is of a durable and reliable construction.

An even further object of the present invention is to provide a new child car seat with air bag protection bar which is susceptible of a low cost of manufacture with regard to both materials and labor, and which accordingly is then susceptible of low prices of sale to the consuming public, thereby making such child car seat with air bag protection bar economically available to the buying public.

Still yet another object of the present invention is to provide a new child car seat with air bag protection bar which provides in the apparatuses and methods of the prior art some of the advantages thereof, while simultaneously overcoming some of the disadvantages normally associated therewith.

Still another object of the present invention is to provide a new child car seat with air bag protection bar for protecting a child in event of the release of an air bag.

Yet another object of the present invention is to provide a new child car seat with air bag protection bar which includes a car seat portion having a seat portion and a back portion. The car seat portion includes a harness strap for securing a child therein. A lower end of the back portion has a slot therethrough for receiving a seat belt of a vehicle therethrough to facilitate securement of the car seat portion within the vehicle. A restraint system is provided including a pair of inner vertical brackets secured on opposing sides of the back portion of the car seat portion. The restraint system includes a pair of outer vertical brackets slidably received within the inner vertical brackets. The restraint system includes a pair of horizontal supports pivotally coupled with upper ends of the outer vertical brackets. An outer portion of the horizontal supports have a channel formed therein. An outer end of the horizontal supports have an aperture therethrough. The restraint system includes a cross bar extending between the outer portions of the horizontal supports.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
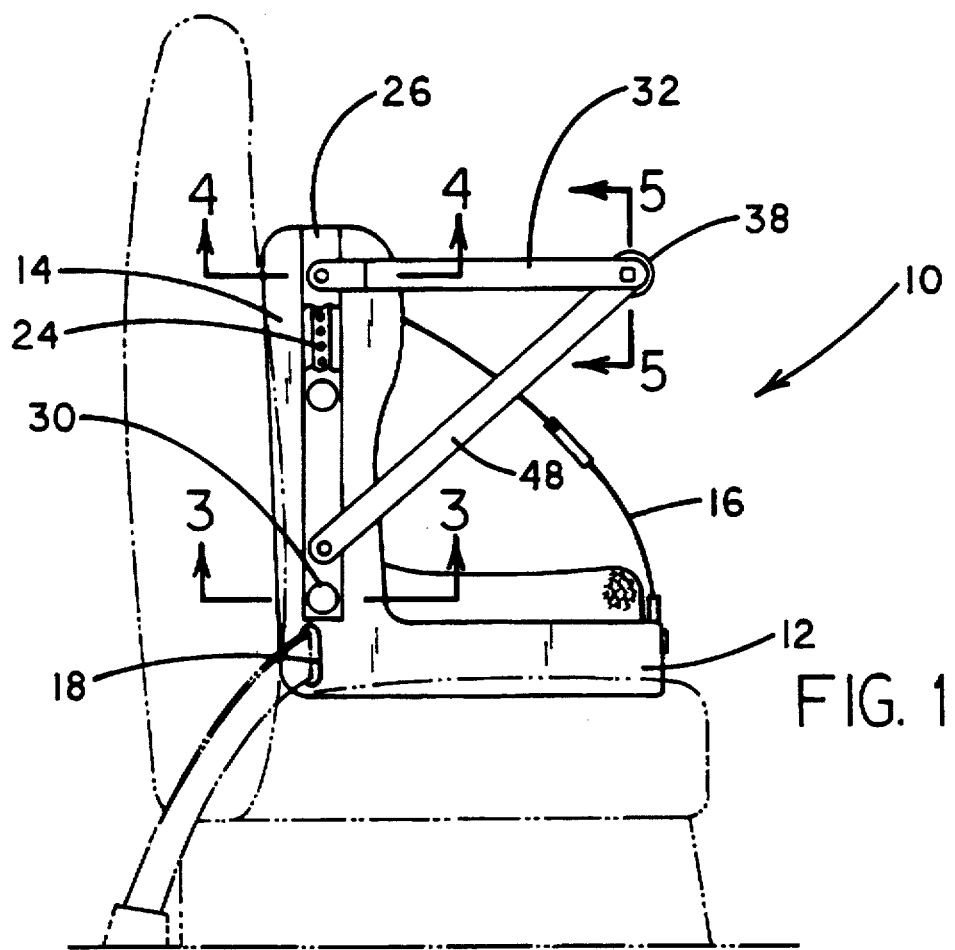
FIG. 1 is a side view of a new child car seat with air bag protection bar according to the present invention.
Figure 2:
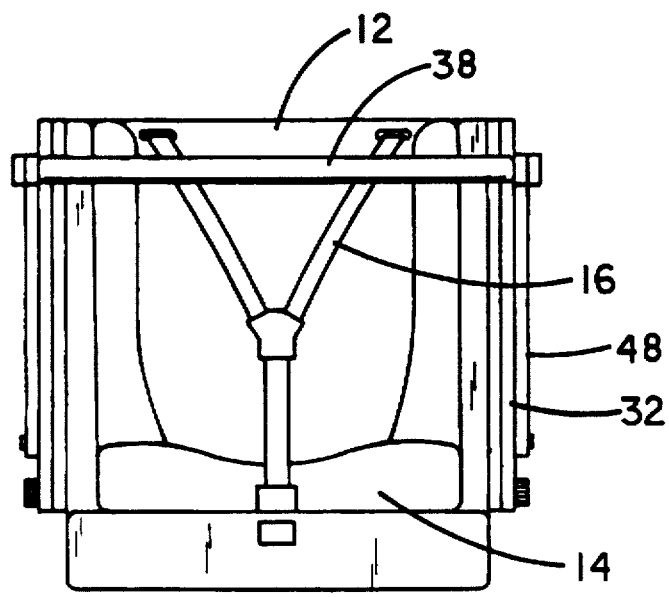
FIG. 2 is a top plan view of the present invention.
Figure 3:
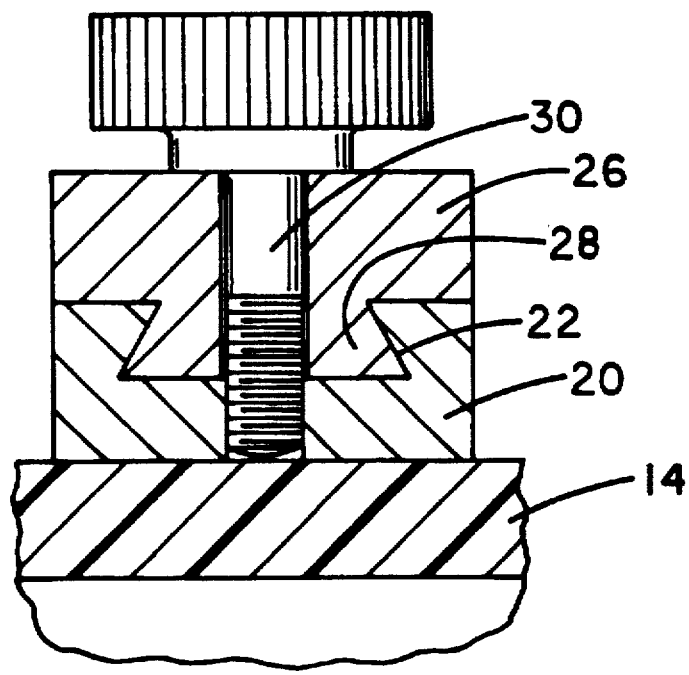
FIG. 3 is a cross-sectional view of the present invention as taken along line 3—3 of FIG. 1.
Figure 4:
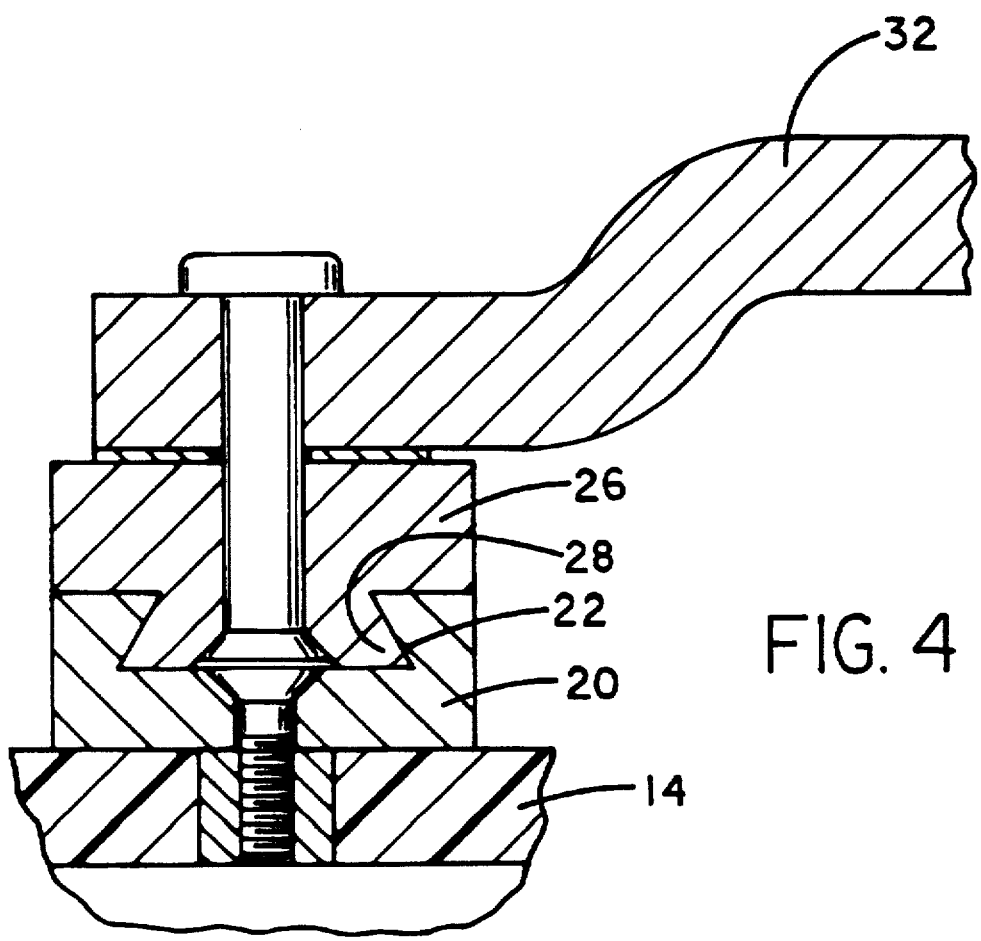
FIG. 4 is a cross-sectional view of the present invention as taken along line 4—4 of FIG. 1.
Figure 5:
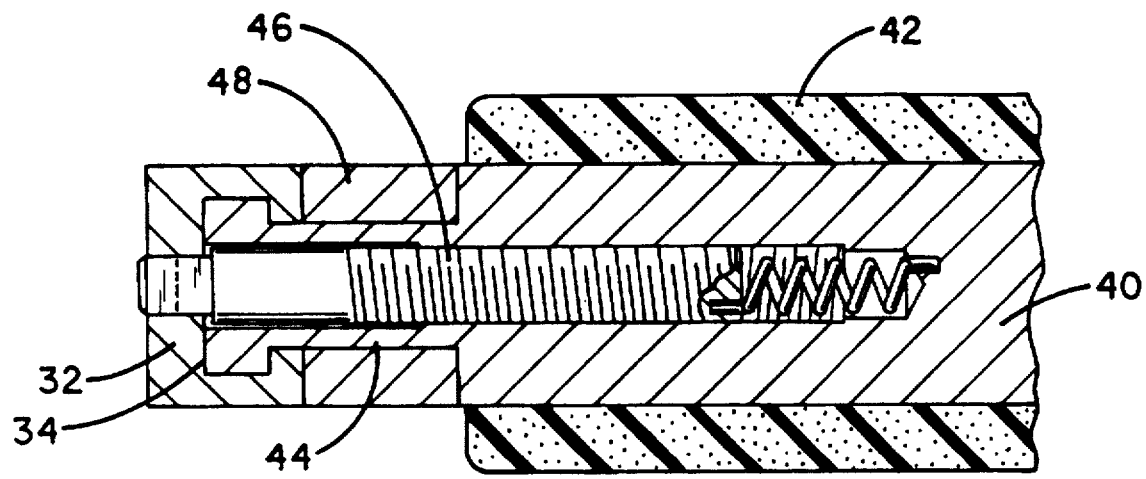
FIG. 5 is a cross-sectional view of the present invention as taken along line 5—5 of FIG. 1.
Figure 6:
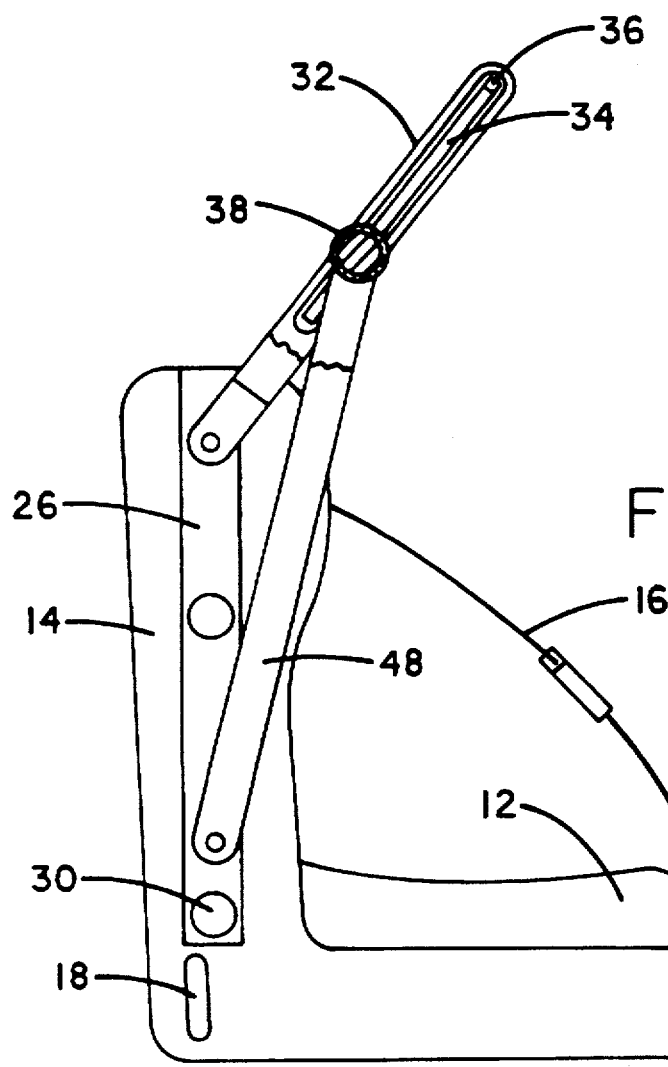
FIG. 6 is a side view of the present invention illustrated in a raised orientation.

With reference now to the drawings, and in particular to FIGS. 1 through 6 thereof, a new child car seat with air bag protection bar embodying the principles and concepts of the present invention and generally designated by the reference numeral 10 will be described.

As best illustrated in FIGS. 1 through 6, the child car seat with air bag protection bar 10 comprises a car seat portion having a seat portion 12 and a back portion 14. The car seat portion includes a harness strap 16 for securing a child therein. A lower end of the back portion 14 has a slot 18 therethrough for receiving a seat belt of a vehicle therethrough to facilitate securement of the car seat portion within the vehicle.

A restraint system is provided including a pair of inner vertical brackets 20 secured on opposing sides of the back portion 14 of the car seat portion. The inner vertical brackets 20 each have a female dovetail recess 22 formed along a length thereof. The recess 22 has a plurality of linearly aligned apertures 24 therein. The restraint system includes a pair of outer vertical brackets 26. The outer vertical brackets 26 each have a male dovetail member 28 extending outwardly therefrom for being slidably received within the female dovetail recesses 22 of the inner vertical brackets 20. The outer vertical brackets 26 each have upper and lower locking pins 30 for selectively engaging two of the plurality of apertures 24 of the inner vertical brackets 20. The restraint system includes a pair of horizontal supports 32 pivotally coupled with upper ends of the outer vertical brackets 26. An outer portion of the horizontal supports 32 have a channel 34 formed therein. An outer end of the horizontal supports 32 have an aperture 36 therethrough. The restraint system includes a cross bar 38 extending between the outer portions of the horizontal supports 32. The cross bar 38 includes an interior rigid member 40 and an exterior padded member 42. The interior rigid member 40 has T-shaped stems 44 extending outwardly of opposite ends thereof for being slidably received within the channels 34 formed within the horizontal supports 32. The opposite ends of the interior rigid member 40 each have a spring pin 46 extending outwardly thereof for selectively engaging the apertures 36 of the outer ends of the horizontal supports 32. To disengage the spring pin 46 from the apertures 36, the user would simply rotate the cross bar 36 which will force the spring pin 46 to retract thereby allowing for the cross bar 36 to slide inwardly within the channels 34 allowing the restraint system to pivot upwardly. The restraint system includes a pair of angular brackets 48 extending between the horizontal supports 32 and the outer vertical brackets 26. Upper ends of the angular brackets 48 pivotally couple with the T-shaped stems 44 of the cross bar 38.

In use, the present invention would provide additional frontal protection for a child in the car seat, possibly protecting him from injuries caused by air bags, and it could be easily and quickly disengaged for free access to the child. The cross bar 38 would be preferably aligned with the head of the child. This is achieved simply by sliding the outer vertical brackets 26 with respect to the inner vertical brackets 20. The parent simply pulls outwardly on the upper and lower locking pins 30 to facilitate this sliding. Once the proper height is found, the locking pins 30 will engage the apertures 24 to lock the device in place.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new child car seat with air bag protection bar for protecting a child in event of a release of an air bag comprising, in combination:

a car seat portion having a seat portion and a back portion, the car seat portion including a harness strap for securing a child therein, a lower end of the back portion having a slot therethrough for receiving a seat belt of a vehicle therethrough to facilitate securement of the car seat portion within the vehicle;

a restraint system including a pair of inner vertical brackets secured on opposing sides of the back portion of the car seat portion, the inner vertical brackets each having a female dovetail recess formed along a length thereof, the recess having a plurality of linearly aligned apertures therein, the restraint system including a pair of outer vertical brackets, the outer vertical brackets each having a male dovetail member extending outwardly therefrom for being slidably received within the female dovetail recesses of the inner vertical brackets, the outer vertical brackets each having upper and lower locking pins for selectively engaging two of the plurality of apertures of the inner vertical brackets, the restraint system including a pair of horizontal supports pivotally coupled with upper ends of the outer vertical brackets, an outer portion of each of the horizontal supports having a channel formed therein, an outer end of each of the horizontal supports having an aperture therethrough, the restraint system including a cross bar extending between the outer portions of the horizontal supports, the cross bar including an interior rigid member and an exterior padded member, the interior rigid member having T-shaped stems extending outwardly of opposite ends thereof for being slidably received within the channels formed within the horizontal supports, the opposite ends of the interior rigid member each having a spring pin extending outwardly thereof for selectively engaging the apertures of the outer ends of the horizontal supports, the restraint system including a pair of angular brackets extending between the horizontal supports and the outer vertical brackets, upper ends of the angular brackets pivotally coupling with the T-shaped stems of the cross bar.

2. A new child car seat with air bag protection bar for protecting a child in event of a release of an air bag comprising, in combination:

a car seat portion having a seat portion and a back portion, the car seat portion including a harness strap for securing a child therein, a lower end of the back portion having a slot therethrough for receiving a seat belt of a vehicle therethrough to facilitate securement of the car seat portion within the vehicle;

a restraint system including a pair of inner vertical brackets secured on opposing sides of the back portion of the car seat portion, the restraint system including a pair of outer vertical brackets slidably received within the inner vertical brackets, the restraint system including a pair of horizontal supports pivotally coupled with upper ends of the outer vertical brackets, an outer portion of each of the horizontal supports having a channel formed therein, an outer end of each of the horizontal supports having an aperture therethrough, the restraint system including a cross bar extending between the outer portions of the horizontal supports.

3. The child car seat with air bag protection bar as set forth in claim 2 wherein the cross bar includes an interior rigid member and an exterior padded member.

4. The child car seat with air bag protection bar as set forth in claim 3 wherein the interior rigid member has T-shaped stems extending outwardly of opposite ends thereof for being slidably received within the channels formed within the horizontal supports.

5. The child car seat with air bag protection bar as set forth in claim 4 wherein the opposite ends of the interior rigid member each have a spring pin extending outwardly thereof for selectively engaging the apertures of the outer ends of the horizontal supports.

6. The child car seat with air bag protection bar as set forth in claim 5 wherein the restraint system includes a pair of angular brackets extending between the horizontal supports and the outer vertical brackets, upper ends of the angular brackets pivotally coupling with the T-shaped stems of the cross bar.

* * * * *